US008043461B2

(12) United States Patent
Hasegawa et al.

(10) Patent No.: US 8,043,461 B2
(45) Date of Patent: Oct. 25, 2011

(54) METHOD FOR MANUFACTURING FIBER REINFORCED CEMENT BOARD

(75) Inventors: Akira Hasegawa, Nagoya (JP); Masayuki Endo, Fujinomiya (JP)

(73) Assignee: Nichiha Corporation, Nagoya-shi, Aichi (JP)

( * ) Notice: Subject to any disclaimer, the term of this patent is extended or adjusted under 35 U.S.C. 154(b) by 93 days.

(21) Appl. No.: 12/536,271

(22) Filed: Aug. 5, 2009

(65) Prior Publication Data

US 2010/0043956 A1 Feb. 25, 2010

(30) Foreign Application Priority Data

Aug. 21, 2008 (JP) ................................ 2008-212707

(51) Int. Cl.
*B32B 37/02* (2006.01)
*B32B 38/04* (2006.01)

(52) U.S. Cl. ........ 156/264; 156/190; 156/191; 156/192; 156/193; 156/243; 156/270

(58) Field of Classification Search .................. 156/190, 156/191, 192, 243, 264, 270, 193
See application file for complete search history.

(56) References Cited

U.S. PATENT DOCUMENTS 1,947,232 A * 2/1934 Smith ............................ 99/330
3,757,624 A * 9/1973 Kruse et al. ..................... 83/271
6,431,241 B1 * 8/2002 Gonzalo ...................... 156/518

FOREIGN PATENT DOCUMENTS

JP 09-094812 A 4/1997
JP 9-249443 * 9/1997

* cited by examiner

*Primary Examiner* — Linda L Gray
(74) *Attorney, Agent, or Firm* — Birch, Stewart, Kolasch & Birch, LLP

(57) ABSTRACT

A method for manufacturing fiber reinforced cement board includes the steps of preparing a formed sheet from slurry containing cement and reinforcing fiber material, cutting off the formed sheet so that each cut-off formed sheet has the same length equal to the circumference of a making roll, forming a laminated sheet by winding the cut-off formed sheet around the making roll a plurality of times so that every layer of the laminated sheet has a cut-off mark wherein the making roll is equipped with a cutting-off wire accommodated in a lateral groove formed in the periphery of the roll, producing a mat by separating the laminated sheet from the making roll by cutting off the laminated sheet by jumping out the cutting-off wire into the cut-off mark portion so that the cut-off section of the cut-off laminated sheet is inclined to the bottom surface of the laminated sheet, and hardening and curing the produced mat.

3 Claims, 4 Drawing Sheets

METHOD FOR MANUFACTURING FIBER REINFORCED CEMENT BOARD

FIELD OF THE INVENTION

The present invention relates to a method for manufacturing a fiber reinforced cement board. More specifically, the present invention relates to a method for manufacturing a fiber reinforced cement board which is formed by laminating a formed sheet made by a sheet-forming process from a slurry containing a cement and a fiber-reinforcing material around a making roll.

RELATED ARTS

A fiber reinforced cement board is used for building material to form a housing wall such as an interior wall and an exterior wall by using a plurality of the boards.

One of the methods for manufacturing the fiber reinforced cement board, which is disclosed in JP 09-94812 A, is as follows.

First, a slurry is prepared by mixing water with cement, siliceous raw material such as silica sand and perlite, and reinforcing fiber such as pulp fiber and synthetic fiber and stirring the mixture. The slurry is applied onto the forming felt of a Fourdrinier former or a cylinder mold former to be dehydrated to form a sheet. The formed sheet is wound around a making roll so as to make a plurality of sheet layers, i.e., a laminated sheet. The laminated sheet is cut off and separated from the making roll, and the cut-off laminated sheet is hardened and cured. The making roll has a cutter and a strip-shaped sheet with a rough surface stuck on the roll located behind the cutter. The strip-shaped sheet with a rough surface is used for picking up the formed sheet from the forming felt to wind it around the making roll and for separating the cut off laminated sheet from the making roll.

BRIEF SUMMARY OF THE INVENTION

In the manufacturing method disclosed in JP 09-94812 A, a cutting off wire capable of jumping out is accommodated in a lateral groove formed in the periphery of the roll. The cutting off wire jumps out of the groove when a laminated sheet reaches a predetermined thickness to cut off the laminated sheet. In this method, however, as the thickness of the laminated sheet increases, the cutting ability of the wire becomes poor, and the wire is wasted. Also, cutting off the laminated sheet produces chips.

Further, an under roll is normally put into place under the making roll so as to provide a pressure between the under roll and the making roll using oil pressure or an air pressure mechanism. The formed sheet and the laminated sheet are nipped between the making roll and the under roll to be dehydrated by pressure generated therebetween. FIG. 4 is a cross sectional view of the laminated sheet formed around the making roll, which represents the manufacturing process in the reference JP 09-94812 A. In FIG. 4, a formed sheet B is transported by an endless felt 5 in the direction indicated by arrow Z and wound around a making roll 6 to form a laminated sheet C while the formed sheet B and the laminated sheet C are being nipped between the making roll 6 and the under roll 7 to be dehydrated by pressure generated therebetween. The cutting off wire 8 jumps out to cut off the laminated sheet C when the formed sheet is wound around the making roll 6 a plurality of times, and the laminated sheet C with a predetermined thickness is formed. As shown in FIG. 4, a cut-off section of the cut-off laminated sheet C is perpendicular to a bottom surface of the laminated sheet C, which forms a step at a border between a trailing end portion of the laminated sheet C to be separated from the making roll and the immediately following formed sheet B.

Consequently, a space between the making roll 6 and the under roll 7 (more precisely between the making roll 6 and the endless felt 5 over the under roll 7) suddenly reduces from the thickness of the laminated sheet C to that of a single formed sheet B when the laminated sheet is completely separated from the making roll 6 (when a trailing end of the cut-off laminated sheet is separated from the making roll 6). This causes some time delay for the space between the making roll 6 and the under roll 7 to reduce to a space which allows the under roll 7 to press the formed sheet B against the making roll 6. In other words, it fails to apply a sufficient pressure quickly to a single formed sheet B, and the single formed sheet B is sometimes not wound around the making roll. If the leading end portion of formed sheet B is not correctly wound around the making roll 6, a laminated sheet with uniform thickness cannot be obtained.

SUMMARY OF THE INVENTION

The present invention has been conceived based on consideration of the above problem. An object of the present invention is therefore to provide a method for manufacturing a fiber-reinforced cement board where a formed sheet can be correctly wound around the making roll and a laminated sheet wound around the making sheet can be surely cut off without producing chips.

In order to accomplish the object above, one aspect of the present invention is a method for manufacturing a fiber reinforced cement board comprising the steps of preparing a formed sheet from a slurry containing cement and fiber-reinforcing material through a sheet-forming process, cutting off the formed sheet so that each cut-off formed sheet has the same length equal to a circumference of the making roll, forming a laminated sheet by winding each cut-off formed sheet continuously around a making roll a plurality of times so that every layer made of the formed sheet in the laminated sheet has a cut-off mark, wherein the making roll is equipped with a cutting-off wire accommodated in a lateral groove formed in the periphery of the roll, producing a mat by separating the laminated sheet from the making roll by cutting off the laminated sheet by jumping out the cutting-off wire into the cut-off mark position so that a cut-off section of the cut-off laminated sheet becomes inclined (oblique) to a bottom surface of the laminated sheet, and hardening and curing the produced mat.

The present invention can be applied to wet sheet-forming process such as Hatschek technique or Flow-on technique.

Since the formed sheet is cut off at equally spaced intervals, i.e., a length equal to a circumference of the making roll, every layer of the formed sheet in the laminated sheet formed around the making roll comes to have a cut-off mark like a seam. The cut-off mark of the formed sheet in the laminated sheet is a portion formed by joining a cut-off section of some cut-off formed sheet with the end portion, surface and/or another cut-off section of the cut-off formed sheet, and/or with a cut-off section of another cut-off formed sheet when they are laminated around the making roll.

Since each cut-off formed sheet has the same length, i.e., length equal to a circumference of the making roll, each cut-off mark in each layer of the formed sheet in the laminated sheet is positioned differently from each other. This is because the length of the periphery of the laminated sheet around the making roll increases as the number of layers of the cut-off formed sheet in the laminated sheet increases while the length of each cut-off formed sheet remains unchanged. This process is more specifically set forth in the following description with reference to FIG. 1, which is a cross sectional view of the laminated sheet formed around the making roll in the present invention.

In FIG. 1, a formed sheet B is transported by an endless felt 5 in the direction indicated by arrow Z and wound around a making roll 6. The formed sheet B is cut off by a sheet cutter 9 at equally spaced intervals, i.e., a length equal to a circumference of the making roll, before being wound around the making roll 6. In FIG. 1, the formed sheet B is initially wound around the making roll 6 after a position of a leading end portion of the formed sheet B is adjusted so as to be placed at a position where a cutting off wire 8 comes out. The required length of the formed sheet B to make exactly one turn around the making roll 6 is equal to a circumference (peripheral length) of the making roll 6 at the first turn. Consequently, when the first layer for the laminated sheet is completely wound around the making roll 6, a cut-off section in a trailing end portion of a first cut-off formed sheet made by the first cutting off by the sheet cutter 9 meets a leading end portion of the cut-off formed sheet. This first cut-off section of the first cut-off formed sheet is immediately followed by a cut-off section of another (second) cut-off formed sheet. Thus, the leading end portion and the cut-off section in the trailing end portion of the first cut-off formed sheet B and the cut-off section of another formed sheet B meet at the position where the cutting off wire 8 is to come out, which forms a cut-off mark 1.

By further winding the formed sheet B around over the first layer wound around the making roll 6, a second layer is formed. The required length of the formed sheet B to make exactly one turn around the outer surface of the first layer, i.e., the length of the second layer, is equal to a circumference of a circle of which the diameter is "diameter of the making roll+2×thickness of first layer," which is longer than the first layer. However, the formed sheet is cut off at equally spaced intervals, i.e., a length equal to a circumference of the making roll, which means a second cut-off formed sheet comes a little short of making one complete turn over the first layer. Consequently, a cut-off section of the second cut-off formed sheet made by the second cutting off, i.e., a trailing end of the second cut-off formed sheet, cannot reach a position just above the cut-off mark 1 when the second cut-off formed sheet is wound. This cut-off section is immediately followed by a cut-off section of another formed sheet, i.e., a leading end of the third cut-off formed sheet, which forms a cut-off mark 2 of which position is shifted from the cut-off mark 1 as shown in FIG. 1.

By further winding a formed sheet B1 around the first and second layers, which are wound around the making roll 6, a third layer is formed around the making roll 6.

The required length of the formed sheet B to make exactly one turn around the making roll 6 with the first and second layers thereon, i.e., the length of the third layer, is equal to a circumference of a circle of which the diameter is "diameter of the making roll+2×thickness of first and second layers," which is longer than both the first layer and the second layer of the laminated sheet. However, the formed sheet is cut off at equally spaced intervals, i.e., a length equal to a circumference of the making roll, which means a third cut-off formed sheet comes a little short of making one complete turn over the first and second layers. Consequently, a cut-off section of the third cut-off formed sheet made by a third cutting off, i.e., a trailing end of the third cut-off formed sheet, cannot reach a position just above the cut-off mark 2 when the third cut-off formed sheet is wound. Thus, the position of the cut-off section formed by the third cutting off comes to a position neither just above the cut-off mark 1 nor just above the cut-off mark 2, i.e., it is shifted from both the cut-off mark 1 and the cut-off mark 2. This cut-off section is immediately followed by another cut-off section, which forms a cut-off mark 3 of which position is shifted from the cut-off mark 2 as shown in FIG. 1.

In the same manner as described above, a fourth layer and a cut-off mark 4 and a fifth layer and a cut-off mark 5 are formed as shown in FIG. 1, where the newly formed cut-off mark does not come to a position just above any of the cut-off marks of the previously formed layers. As shown in FIG. 1, every layer of the laminated sheet C has the cut-off mark of which position is different in each layer, and the series of the cut-off marks makes an inclined line to the bottom surface of the laminated sheet C.

In the example shown in FIG. 1, the formed sheet B is cut off so as to make the cut-off section become inclined to the bottom surface of the formed sheet B. It is also possible to cut off the formed sheet B so as to make the cut-off section be perpendicular to the bottom surface of the formed sheet B. In this case, cutting off the laminated sheet by the cutting off wire 8 tends to make a cut-off section of each formed sheet perpendicular, which results in providing a cut-off section of the laminated sheet C with a stairs-like shape. However, this stairs-like shape, as a whole, looks like an oblique plane to the bottom surface of the laminated sheet. Consequently, the change of space between the making roll 6 and the under roll 7 becomes gradual, which can prevent the problem of failure of winding a formed sheet B around the making roll 6 after cutting off a laminated sheet C. It is preferable to cut off the formed sheet B so as to make the cut-off section be inclined to the bottom surface of the formed sheet B since it can provide a cut-off section of the laminated sheet C with a smoother slope.

Cutting off the laminated sheet C is carried out by the cutting off wire 8 capable of jumping out accommodated in a lateral groove in the periphery of the making roll 6.

The formed sheet B is initially wound around the making roll 6 after a position of a leading end portion of the formed sheet B is adjusted so as to be placed at a position where a cutting off wire 8 comes out. In other words, a cut-off mark is to be formed at the position where the cutting off wire 8 is to jump out. When the wire 8 jumps out and presses the cut-off mark portion after a plurality of layers of the formed sheet B are wound around the making roll 6 to form a laminated sheet with a predetermined thickness or after a predetermined number of turns of the formed sheet around the making roll 6 are made, the laminated sheet C is easily cut off along series of cut-off marks provided by each of layers since the cut-off mark portion is mechanically weaker than any other parts of the laminated sheet. The series of cut-off marks makes an inclined line to the bottom surface of the laminated sheet. Therefore, cutting off the laminated sheet along the series of the cut-off marks provides the laminated sheet C with a cut-off section inclined to the bottom of the laminated sheet.

The degree of inclination of the cut-off section of the laminated sheet is not limited. For example, the entire cut-off section can be inclined at a constant angle to the bottom surface of the laminated sheet or each layer of formed sheet wound around the making roll is cut off perpendicularly but the cut-off position is gradually shifted so that the cut-off section forms an inclined surface as a whole, i.e., the surface represented by the whole cut-off section of the laminated sheet is inclined to the bottom surface of the laminated sheet. The angle between the inclined surface of the cut-off section and the bottom surface is preferably 45 degrees or less in order to ensure that the formed sheet begins to properly wind around the making roll 6 following the cut-off laminated sheet since the space between the making roll and the under roll is able to change more gradually. Thus, the pressure to the formed sheet just following the cut-off laminated sheet can be consistently applied so as to be wound around the making roll.

A mat obtained by separating the laminated sheet from the making roll is subjected to a press process or a press for embossing as needed and cut off into a predetermined length.

A mat is cured by leaving the mat under normal pressure with or without heating in a closed chamber. Further, the mat is hardened by being subjected to an autoclave cure or a steam cure as needed.

According to the present invention, the laminated sheet wound around the making roll is cut off so that the cut-off section becomes oblique to the bottom surface of the laminated sheet. In other words, the cut-off laminated sheet has a tapered portion at the cut-off end area. Consequently, the space between the making roll and the under roll changes gradually while the cut-off laminated sheet is separated from the making roll and followed by the formed sheet to be wound around the making roll, which makes it possible to surely apply pressure to the formed sheet so as to be urged toward the making roll. This can prevent the problem of a failure of winding a formed sheet around the making roll after cutting off a laminated sheet. This can also improve the problems of wasting the wire when the cutting ability of the wire becomes poor due to the thickness of the laminated sheet increasing and also producing chips when cutting off the laminated sheet.

Another aspect of the present invention is the method described above, wherein the formed sheet is cut off so that a cut-off section of the formed sheet is oblique to a bottom surface of the formed sheet and the laminated sheet is 9 mm or more in thickness. The angle between the surface of the cut-off section and the bottom surface is preferably 45 degrees or less.

According to this embodiment, even when the thickness of the laminated sheet is 9 mm or more, the space between the making roll and the under roll changes gradually while the cut-off laminated sheet is separated from the making roll and followed by the formed sheet to be wound around the making roll, which makes it possible to surely apply pressure to the formed sheet so as to be urged toward the making roll. This can prevent the problem of a failure of winding a formed sheet around the making roll.

According to the method for manufacturing a fiber-reinforced cement board of the present invention, where the cut-off section of the laminated sheet wound around the making roll is inclined, the space between the making roll and the under roll changes gradually while the cut-off laminated sheet is separated from the making roll and followed by the formed sheet to be wound around the making roll, which makes it possible to surely apply pressure to the formed sheet so as to be pressed against the making roll. This can prevent the problem of failure of winding a formed sheet around the making roll. This can also improve the problems of the cutting ability of the wire becoming poor and the wire is wasted when the thickness of the laminated sheet increases, and also, cutting off the laminated sheet produces chips.

DETAILED DESCRIPTION OF THE INVENTION

Preferred embodiments of the present invention are described below with reference to FIG. 2 and FIG. 3.

Figure 1:
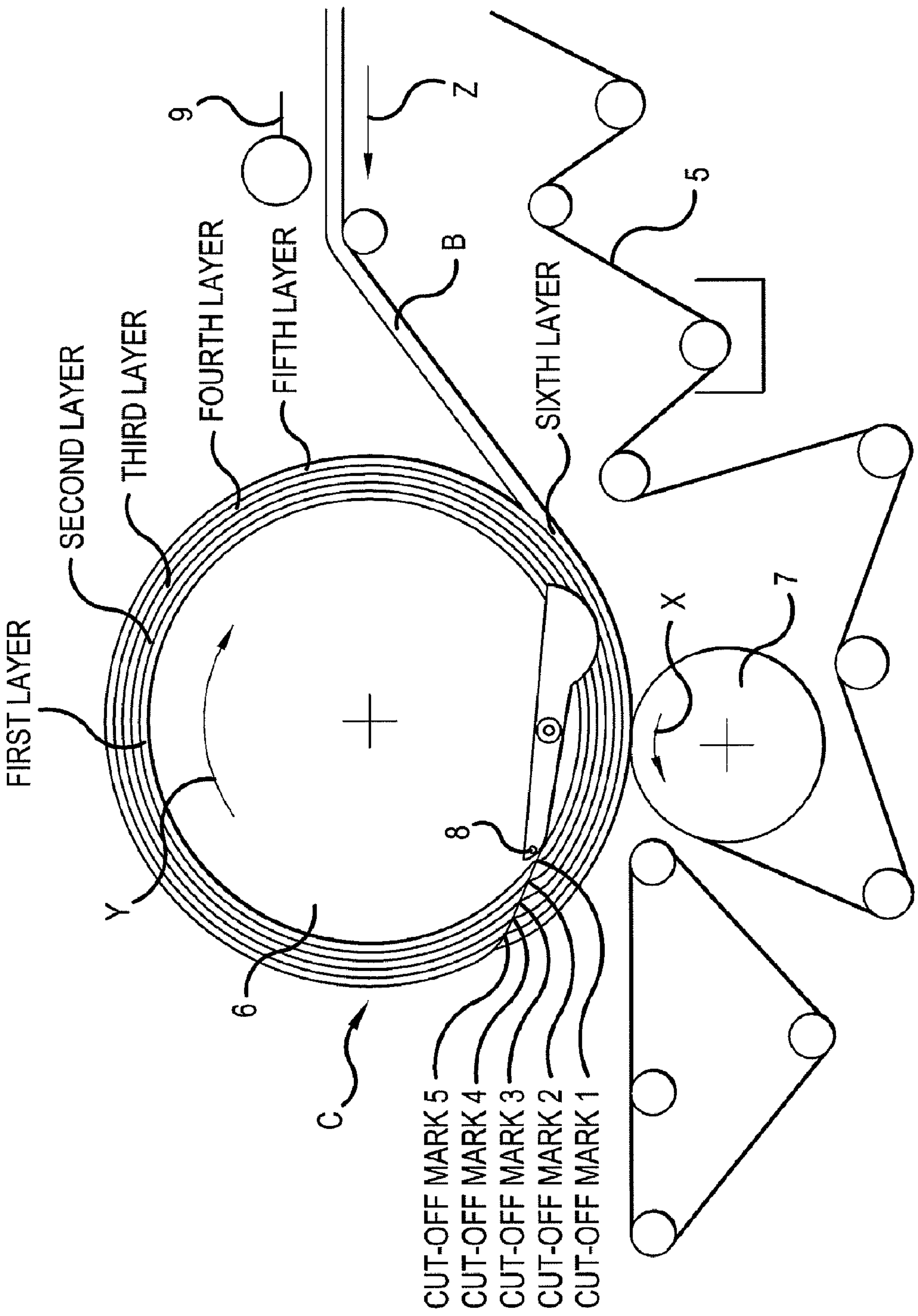
FIG. 1 is a cross sectional view of the laminated sheet formed around the making roll in the manufacturing method of the present invention.
Figure 2:
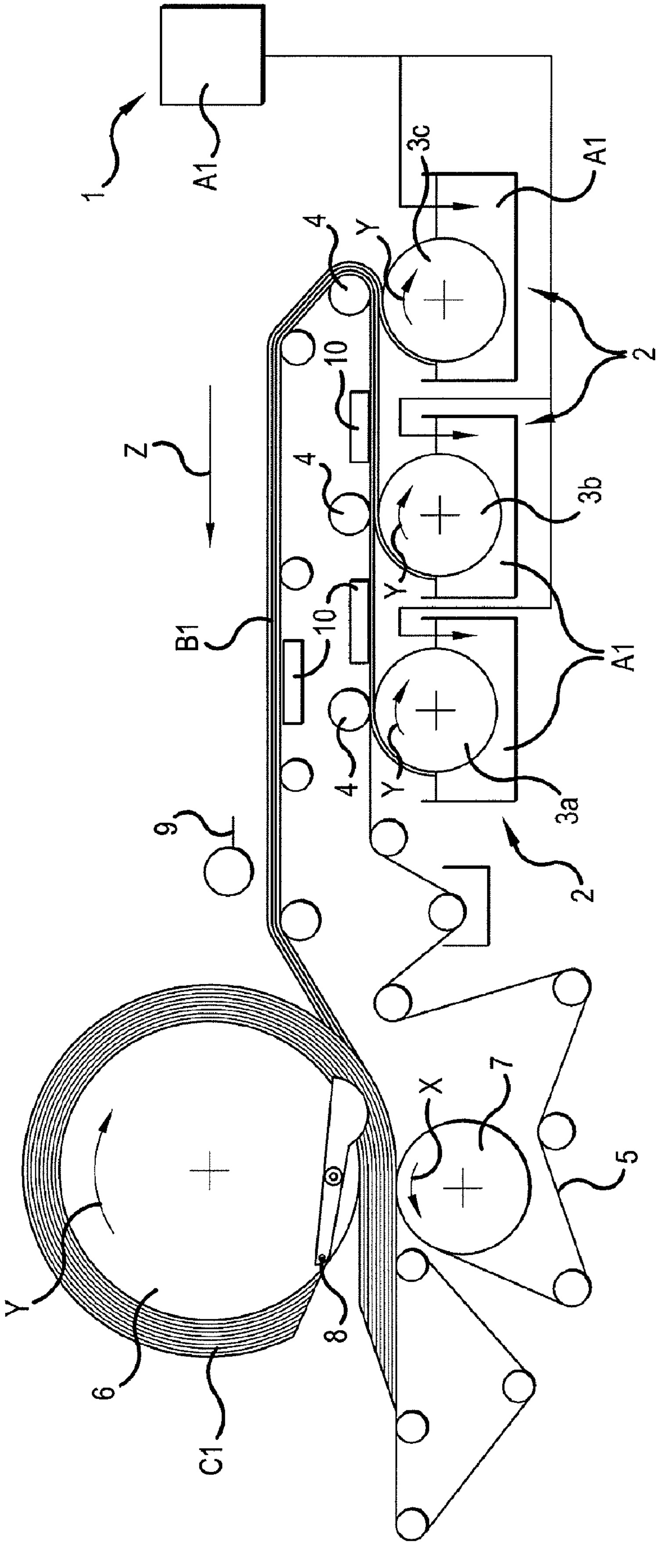
FIG. 2 is a cross sectional view of an example of a machine performing the manufacturing method of the present invention.

FIG. 2 is a cross sectional view of an example of a machine performing the manufacturing method of the present invention.

The machine shown in FIG. 2, utilizing a Hatschek type forming machine, includes a raw material tank 1, a vat 2, cylinders 3*a*-3*c*, a roll 4, an endless felt 5, a making roll 6, an under roll 7, a cutting off wire 8, and a sheet cutter 9. In this machine, the endless felt 5 is nipped between the making roll 6 and the under-roll 7 and also nipped between the roll 4 and the cylinder 3*a*, another roll 4 and the cylinder 3*b*, and another roll 4 and the cylinder 3*c*.

When the under roll 7 rotates in the direction indicated by arrow X, the endless felt 5 is transported in the direction indicated by arrow Z. This moving endless felt 5 causes the making roll 6 and the cylinders 3*a*-3*c* to rotate in the arrow Y direction. The endless felt 5 also cause each of rolls 4 to rotate. Consequently, the rotations of the cylinders 3*a*-3*c*, the rolls 4, the making roll 6, and the under roll 7 go along with the movement of the endless felt 5. A pressure is held between the making roll 6 and the under roll 7 using oil pressure.

Slurry A1 containing a cement and a fiber-reinforcing material is stored in the raw material tank 1. The tank 1 is connected to the vat 2 in order to feed the slurry A1 into the vat 2.

Each vat 2 has each of cylinders 3*a*-3*c*, where each of cylinders 3*a*-3*c* is a wire mesh cylinder. The slurry A1 is fed into the vat 2 so that the level of the slurry can be kept at about the midpoint of the height of the cylinder.

As the cylinders 3*a*-3*c* rotate, the solid content of the slurry A1 is continuously accumulated on the surface of the wire mesh since the water of the slurry goes through the wire mesh but the solid content does not. The accumulated solid content of the slurry A1 is continuously transferred onto the endless felt 5. The transferred solid content on the endless felt 5 forms a sheet. As the endless felt 5 is transported in the direction indicated by arrow Z, each sheet transferred onto the endless felt 5 can be transferred onto the making roll 6. The water going through the wire mesh of cylinders 3*a*-3*c* is discharged outside the vat 2.

This machine has three consecutive vats 2. Therefore, three sheets are continuously formed on the endless felt 5. A first sheet on the endless felt made by the cylinder 3*a* is suction-dehydrated through the endless felt 5 by suction box 10. A second sheet made by the cylinder 3*b* is piled on the first sheet and is suction-dehydrated through the endless felt 5 by another suction box 10. A third sheet made by the cylinder 3*c* is piled on the previously formed two-layered (the first and the second) sheet to form a three-layered formed sheet B1 and is suction-dehydrated through the endless felt 5 by another suction box 10 in order to adjust the water content of the three-layered sheet to be suited for being wound around the making roll. Thus, the formed sheet B1 is wound around the making roll 6.

The formed sheet B1 formed on an endless felt 5 is transferred by the endless felt 5 onto the making roll 6. A sheet cutter 9 is located before the making roll 6 above the endless felt 5.

The formed sheet B1 is cut off by a swinging sheet cutter 9 at equally spaced intervals before being wound around the making roll. Since the making roll 6 of this machine has a diameter of 100 cm, the equally spaced cut-off intervals are set at 314 cm, the circumference of the making roll 6.

The making roll 6 is equipped with a cutting-off wire capable of jumping out accommodated in a lateral groove formed in the periphery of the roll.

The formed sheet B1 is initially wound around the making roll 6 after a position of a leading end portion of the formed sheet B1 is adjusted so as to be placed at a position where a cutting off wire 8 comes out.

The formed sheet B1 is wound around the making roll 6 a predetermined number of times (to make a predetermined number of turns) to obtain a laminated sheet C1 with a predetermined thickness. As a result, every layer made of the formed sheet B1 in the laminated sheet C1 has a cut-off mark at a different position in each layer, and the series of the cut-off marks makes an inclined line to the bottom surface of the laminated sheet C1 in the cross sectional view.

When the formed sheet B1 is wound around the making roll 6 a predetermined number of times, the cutting off wire 8 mounted on the making roll 6 jumps out to cut off the laminated sheet C1 and separate it from the making roll 6.

When the wire 8 jumps out, the cut-off mark portion of each formed sheet of the laminated sheet C1 is pressed by the wire. Since the cut-off mark portion is mechanically weaker than any other parts of the laminated sheet C1, the laminated sheet C1 is cut off along the series of the cut-off marks. As described before, the series of the cut-off marks makes an inclined line to the bottom surface of the laminated sheet C1 in the cross sectional view. Consequently, the cut-off section of the laminated sheet C1 also makes an oblique surface to the bottom of the laminated sheet.

Then, the separated laminated sheet C1 (mat) is transferred to another process to be hardened and cured. As needed, the separated laminated sheet C1 (mat) is pressed and/or cut off into a predetermined length.

An example (Example 1) of the manufacturing method of the present invention using the machine shown in FIG. 2 is described below.

Slurry A1 is prepared by mixing water with a raw material mixture of cement of 67 mass %, pulp fiber of 15 mass %, and perlite of 18 mass % and stored in the tank 1.

The slurry A1 is fed into each of the three vats 2 so that the level of the slurry can be kept at about the midpoint of the height of the cylinder 3. As the cylinders 3*a*-3*c* rotate, the solid content of the slurry A1 is continuously accumulated on the surface of the wire mesh of each cylinder, and the accumulated solid content on each cylinder is continuously transferred onto the endless felt 5 to form a sheet of 0.4 mm thickness. Three sheets formed by the three cylinders are piled in turn on the felt 5 to form a three-layered sheet of 1.2 mm thickness after the water content is adjusted by the suction box 10.

The three-layered formed sheet B1 with 1.2 mm total thickness, which is to be transferred from the endless felt 5 to the making roll 6, is cut off by a swinging sheet cutter 9 at equally spaced intervals of about 314 cm, which is a circumference of the making roll 6, before being wound around the making roll 6. The length of 314 cm is equal to the circumference of the making roll 6. The swing cutting speed of the sheet cutter 9 is adjusted so that the cut-off section becomes oblique (inclined) 10-20 degrees from the bottom surface of the formed sheet B1.

Each cut-off formed sheet B1 is continuously transferred to the making roll 6 and wound around the making roll 6. The formed sheet B1 is wound around the making roll 10 times so as to form the laminated sheet C1 with 12 mm thickness. As the formed sheet B1 has three layers (in terms of one layer made by each single cylinder), the laminated sheet C1 has 30 layers in total. Continuously, a second cut-off formed sheet B1 made by the second cutting off is wound around the making roll 6 to form a laminated sheet.

Since the equally spaced cut-off intervals of the formed sheet B1 are set at 314 cm the circumference of the making roll 6, a first cut-off formed sheet B1 made by the first cutting off can form exactly one turn of the sheet around the making roll 6.

However, a second cut-off formed sheet B1 made by the second cutting off is a little short in length of making one complete turn over the first cut-off formed sheet since the length of the second one is exactly the same as the first one and the length required for this second complete turn is increased because the circumference to be wound around increases due to the thickness of the first cut-off formed sheet. Consequently, the cut-off mark made by the second cut-off formed sheet (cut-off mark 2) is shifted in position from the cut-off mark made by the first cut-off formed sheet (cut-off mark 1).

Continuously, a third cut-off formed sheet B1 made by the third cutting off is wound around the two turns of formed sheet B1, which is wound around the making roll 6, to form a laminated sheet. However, a third cut-off formed sheet B1 made by the third cutting off is a little short in length of making one complete turn over the first and second cut-off formed sheets since the length of the third one is about 314 cm, which is exactly the same as both the first one and the second one, and the length required for this third complete turn is increased because the circumference to be wound around increases due to the thickness of the first and second cut-off formed sheets. Consequently, the cut-off mark made by the third cut-off formed sheet (cut-off mark 3) is shifted in position from each of the cut-off marks 1 and 2 made by the first and second cut-off formed sheets.

Likewise, all the cut-off marks in each layer are formed in a different position up to 10 turns. As a result, every layer made of the formed sheet B1 in the laminated sheet C1 has a cut-off mark in a different position in each layer, and the series of the cut-off marks makes an inclined line to the bottom surface of the laminated sheet C1 in the cross sectional view.

After the formed sheet B1 is wound around the making roll 6 ten times, the cutting off wire 8 mounted on the making roll 6 jumps out to cut off the laminated sheet C1 and separate it from the making roll 6. Since the cut-off mark portion is mechanically weaker than any other parts of the laminated sheet C1, the laminated sheet C1 is cut off along the series of the cut-off marks. The cut-off section of the laminated sheet C1 becomes oblique (inclined) to about 10-20 degrees from the bottom surface of the laminated sheet C1. This makes it easy for the under roll 7 to quickly return to the appropriate position so as to press the leading end portion of the following formed sheet B1 against the making roll 6 when the laminated sheet is completely separated from the making roll 6 (when a trailing end of the cut-off laminated sheet C1 is separated from the making roll 6). Consequently, failure in winding the formed sheet B1 around the making roll 6 does not occur.

Also, the problems of the cutting ability of wire becoming poor and producing chips when cutting off the laminated sheet disappear.

Another example (Example 2) of the manufacturing method of the present invention using the machine shown in FIG. 2 is described below.

Experimental conditions of this example (Example 2) is the same as Example 1 except that (1) the swing cutting speed of the sheet cutter 9 is adjusted so that the cut-off section of the formed sheet B1 becomes perpendicular to the bottom surface of the formed sheet B1 and (2) the formed sheet B1 is wound around the making roll 6 five times (five turns) so as to prepare the laminated sheet C1 with 6 mm thickness.

In this example, although each layer of formed sheet B1 in the laminated sheet has a perpendicular cut-off section, the series of the cut-off marks is as a whole inclined to the bottom surface of the laminated sheet C1 in the cross sectional view. As a result, the laminated sheet C1 with the cut-off section inclined as a whole to the bottom surface is obtained. Because of the inclined cut-off section and relatively thin laminated sheet C1 with 6 mm thickness, the under roll is allowed to quickly return to the appropriate position so as to press the leading end portion of the following formed sheet B1 against the making roll 6 when the laminated sheet is completely separated from the making roll 6 (when a trailing end of the cut-off laminated sheet is separated from the making roll 6). Consequently, failure in winding the formed sheet B1 around the making roll 6 does not occur. Also, the problems of the cutting ability of wire becoming poor and producing chips when cutting off the laminated sheet disappear.

Figure 3:
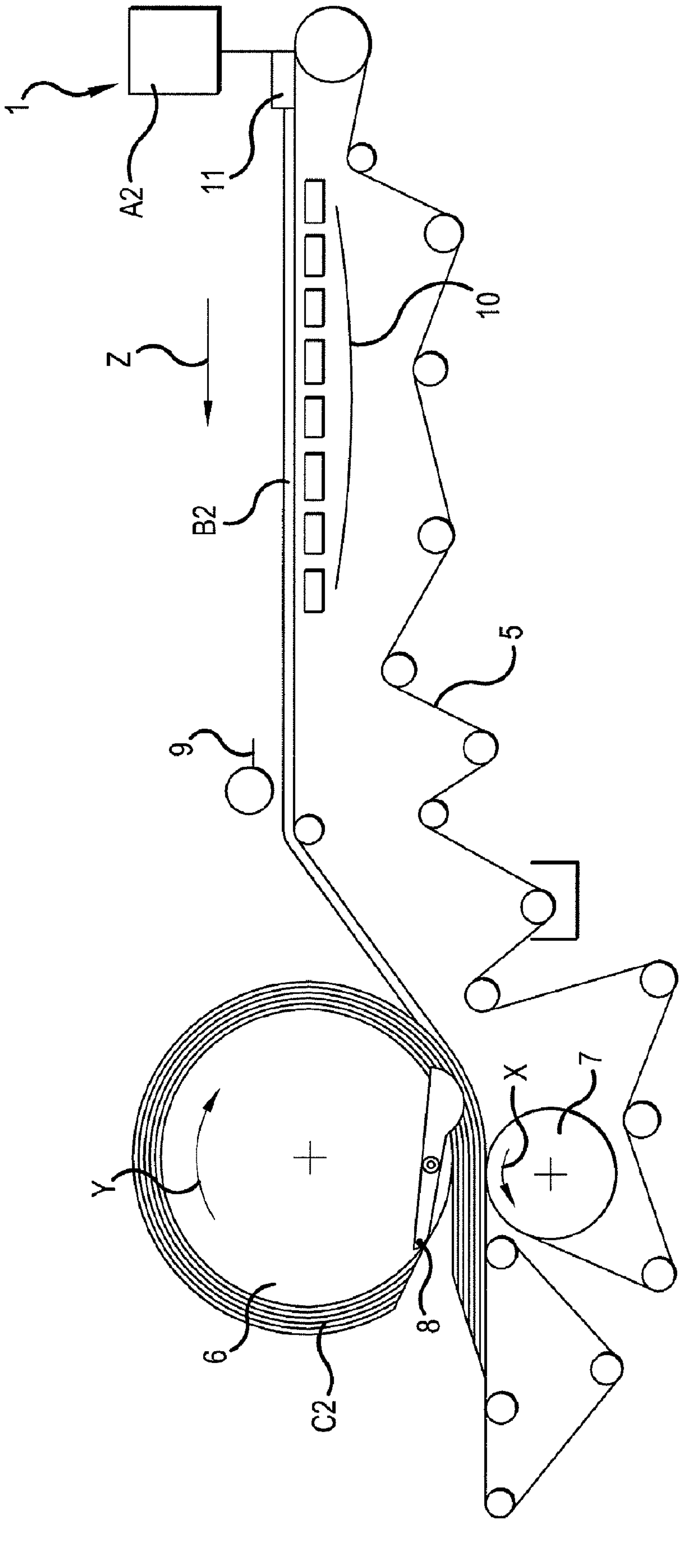
FIG. 3 is a cross sectional view of another example of a machine performing the manufacturing method of the present invention.
Figure 4:
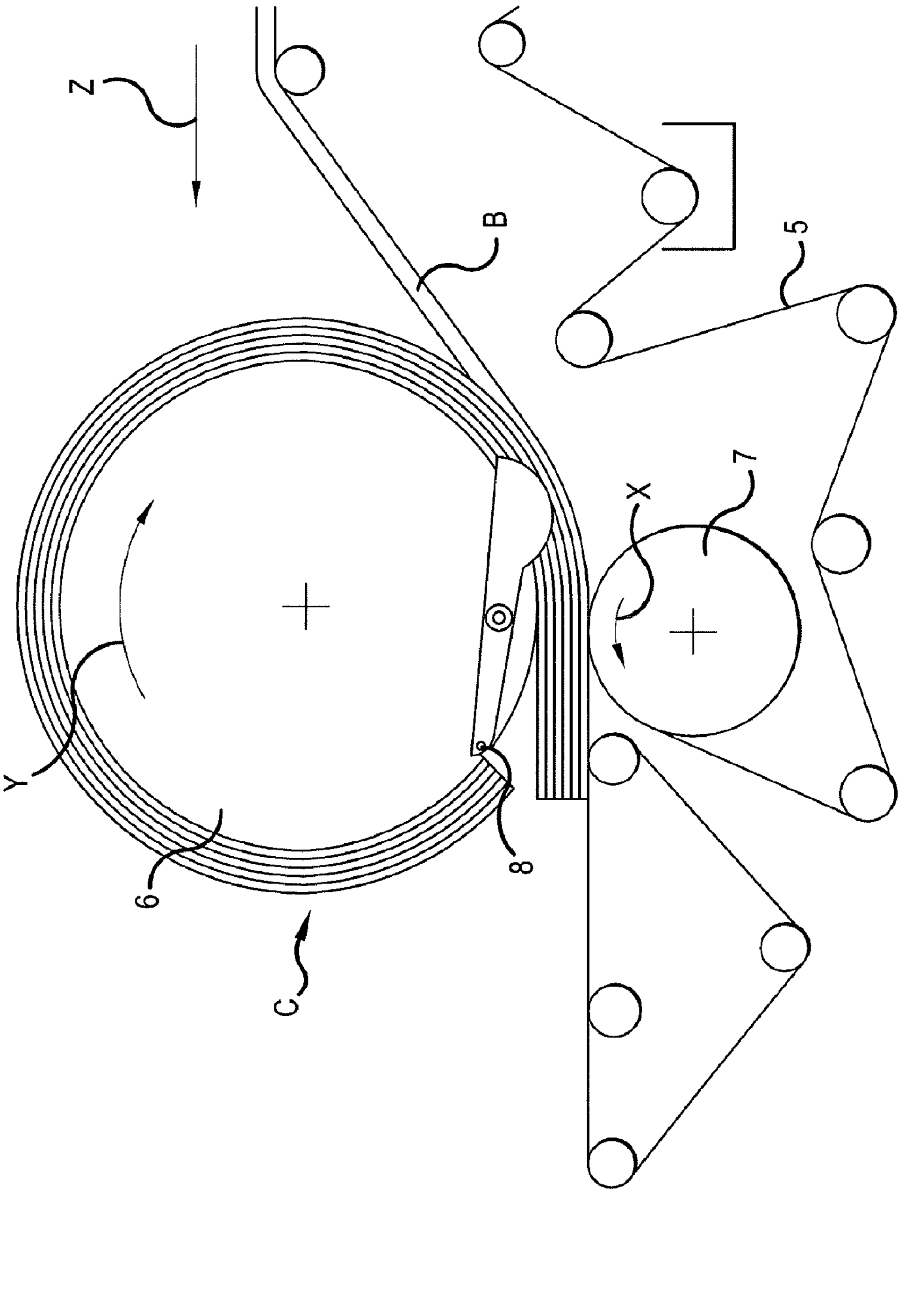
FIG.4 PRIOR ART
FIG. 4 is a cross sectional view of the laminated sheet formed around the making roll after cutting-off in the conventional manufacturing method.

FIG. 3 is a cross sectional view of another example of a machine performing the manufacturing method of the present invention.

The machine shown in FIG. 3, utilizing a Flow-on type forming machine, includes a raw material tank 1, an endless felt 5, a flow box 11, a suction box 10, a making roll 6, an under roll 7, a cutting off wire 8, and a sheet cutter 9.

In this machine, the endless felt 5 is nipped between the making roll 6 and the under roll 7. When the under roll 7 rotates in the direction indicated by arrow X, the endless felt 5 is transported in the direction indicated by arrow Z. This moving endless felt 5 causes the making roll 6 to rotate in the direction indicated by arrow Y. Consequently, rotations of the making roll 6 and the under roll 7 go along with the movement of the endless felt 5. A pressure is held between the making roll 6 and the under roll 7 using oil pressure.

Slurry A2 containing a cement and a fiber-reinforcing material is stored in the raw material tank 1. The slurry A2 is fed from the raw material tank 1 to the flow box 11 where the slurry is continuously applied onto the endless felt 5. The suction box 10 is placed under the endless felt 5 between the flow box 11 and the sheet cutter 9. The suction box 10 is a suction-dehydrator which suction-dehydrates the slurry A2 via endless felt 5 to form a sheet B2 on the endless felt 5.

Therefore, the formed sheet B2 to be wound around the making roll 6 in this Flow-on type forming machine is a single layer sheet unlike the formed sheet B1 with three layers in the previous examples made by using a Hatschek type forming machine.

The making roll 6, the under roll 7, the cut-off wire 8, and the sheet cutter 9 are the same as ones shown in FIG. 2 and are operated in the same way.

An example (Example 3) of the manufacturing method of the present invention using the machine shown in FIG. 3 is described below.

Slurry A2 is prepared by mixing water with a raw material mixture of cement of 67 mass %, pulp fiber of 15 mass %, and perlite of 18 mass % and stored in the raw material tank 1.

The slurry A2 is fed from the raw material tank 1 to the flow box 11 where the slurry is continuously applied onto the endless felt 5. The suction box 10 continuously suction-dehydrates the slurry A2 via endless felt 5 to form a sheet B2 with 2 mm thickness on the endless felt 5.

The formed sheet B2 with 2 mm thickness is then transferred from the endless felt 5 to the making roll 6. The formed sheet B2 with 2 mm thickness is cut off by a swinging sheet cutter 9 at equally spaced intervals of about 314 cm before being wound around the making roll 6. The length of 314 cm is equal to the circumference of the making roll 6. The swing cutting speed of the sheet cutter 9 is adjusted so that the cut-off section of the formed sheet B2 becomes oblique (inclined) at 10-20 degrees from the bottom surface of the formed sheet B2.

Each cut-off formed sheet B2 is continuously transferred to the making roll 6 and wound around the making roll 6. The formed sheet B2 is wound around the making roll six times (six turns) so as to form the laminated sheet C2 with 12 mm thickness. As the formed sheet B2 is a single layer sheet, the laminated sheet C2 has six layers.

As a result, every layer made of the formed sheet B2 in the laminated sheet C2 has a cut-off mark at a different position in each layer, and the series of the cut-off marks makes an oblique line to the bottom surface of the laminated sheet C2 in the cross sectional view.

After the formed sheet B2 is wound around the making roll 6 six times, the cutting off wire 8 mounted on the making roll 6 jumps out to cut off the laminated sheet C2 and separate it from the making roll 6.

Since the cut-off mark portion is mechanically weaker than any other parts of the laminated sheet C2, the laminated sheet C2 is cut off along the series of the cut-off marks. The cut-off section of the laminated sheet C2 becomes oblique (inclined) at about 10-20 degrees from the bottom surface of the laminated sheet C2. This makes it easy for the under roll 7 to quickly return to the appropriate position so as to press the leading end portion of the following formed sheet B2 against the making roll 6 when the laminated sheet is completely separated from the making roll 6 (when a trailing end of the cut-off laminated sheet is separated from the making roll 6). Consequently, failure in winding the formed sheet B2 around the making roll 6 does not occur. Also, the problems of the cutting ability of the wire becoming poor and producing chips when cutting off the laminated sheet C2 disappear.

Another example (Example 4) of the manufacturing method of the present invention using the machine shown in FIG. 3 is described below.

Experimental conditions of this example (Example 4) is the same as Example 3 except that (1) the swing cutting speed of the sheet cutter 9 is adjusted so that the cut-off section of the formed sheet B2 becomes perpendicular to the bottom surface of the formed sheet B2 and (2) the formed sheet B2 is wound around the making roll 6 three times (three turns) so as to prepare the laminated sheet C2 with 6 mm thickness.

In this example, although each layer of formed sheet B2 in the laminated sheet has a perpendicular cut-off section, the series of the cut-off marks is as a whole inclined to the bottom surface of the laminated sheet C2 in the cross sectional view. As a result, the laminated sheet C2 with the cut-off section inclined as a whole to the bottom surface is obtained. Because of the inclined cut-off section and relatively thin laminated sheet C2 with 6 mm thickness, the under roll 7 is allowed to quickly return to the appropriate position so as to press the leading end portion of the following formed sheet B2 against the making roll 6 when the laminated sheet C2 is completely separated from the making roll 6 (when a trailing end of the cut-off laminated sheet is separated from the making roll 6). Consequently, failure in winding the formed sheet B2 around the making roll 6 does not occur. Also, the problems of the cutting ability of the wire becoming poor and producing chips when cutting off the laminated sheet C2 disappear.

The present invention is not limited to the above described embodiments but can include various modifications within the scope of the claims. For example, any number of vats 2 and cylinders 3 can be applied in the machine of FIG. 2. Also, the diameter of the making roll and the thickness of the formed sheet and the laminated sheet can be set without particular limitation in the machines shown in FIG. 2 and FIG. 3. As an inclined angle of the cut-off section of the laminated sheet changes according to the number of turns of the formed sheet wound around the making roll, the inclined angle of the cut-off section of the laminated sheet is optional. An inclined angle of the cut-off section of the formed sheet is selected as appropriate.

As described above, according to the method for manufacturing a fiber-reinforced cement board of the present invention, where the cut-off section of the laminated sheet wound around the making roll is inclined, the space between the making roll and the under roll changes gradually while the cut-off laminated sheet is separated from the making roll and followed by the formed sheet to be wound around the making roll, which makes it possible to surely apply the pressure to the formed sheet so as to be pressed against the making roll. This can prevent the problem of failure of winding a formed sheet around the making roll. This can also improve the problems of the cutting ability of the wire becoming poor so that the wire is wasted when the thickness of laminated sheet increases and also the production of chips when cutting off the laminated sheet.

What is claimed is:

1. A method for manufacturing fiber reinforced cement board, comprising the steps of:

preparing a formed sheet from a slurry containing cement and fiber-reinforcing material through a sheet-forming process, cutting off the formed sheet before being wound around a making roll so that each cut-off formed sheet has the same length equal to a circumference of the making roll, forming a laminated sheet by winding each cut-off formed sheet continuously around a making roll a plurality of times so that every layer made of the formed sheet in the laminated sheet has a cut-off mark, wherein the making roll is equipped with a cutting-off wire accommodated in a lateral groove formed in the periphery of the roll, producing a mat by separating the laminated sheet from the making roll by cutting off the laminated sheet by jumping out the cutting-off wire into the cut-off mark of an undermost formed sheet adjacent to the making roll so that a cut-off section of the cut-off laminated sheet becomes inclined to a bottom surface of the laminated sheet, and hardening and curing the produced mat.

2. The method according to claim 1, wherein the formed sheet is cut off so that the cut-off section of the formed sheet becomes inclined to d bottom surface of the formed sheet and the laminated sheet is 9 mm or more in thickness.

3. The method according to claim 1, wherein the laminated sheet is cut-off by jumping out the cutting-off wire along a series of the cut-off marks formed by each of the formed sheets.

* * * * *